United States Patent
Yoda

(10) Patent No.: US 7,420,315 B2
(45) Date of Patent: Sep. 2, 2008

(54) ACTUATOR

(75) Inventor: Mitsuhiro Yoda, Shiojiri (JP)

(73) Assignee: Seiko Epson Corporation (JP)

(*) Notice: Subject to any disclaimer, the term of this patent is extended or adjusted under 35 U.S.C. 154(b) by 282 days.

(21) Appl. No.: 11/300,109

(22) Filed: Dec. 14, 2005

(65) Prior Publication Data

US 2006/0125346 A1 Jun. 15, 2006

(30) Foreign Application Priority Data

Dec. 15, 2004 (JP) ............................. 2004-363607

(51) Int. Cl.
*H02N 1/00* (2006.01)
*G02B 26/08* (2006.01)
(52) U.S. Cl. ...................................... 310/309
(58) Field of Classification Search .............. 310/306, 310/309
See application file for complete search history.

(56) References Cited

U.S. PATENT DOCUMENTS

| | | | | |
|---|---|---|---|---|
| 5,895,850 | A * | 4/1999 | Buestgens | 73/504.12 |
| 6,765,711 | B2 * | 7/2004 | Min et al. | 359/290 |
| 6,891,650 | B2 * | 5/2005 | Mizuno et al. | 359/224 |
| 6,911,913 | B2 * | 6/2005 | Kim et al. | 340/593 |
| 6,925,710 | B1 * | 8/2005 | Scalf et al. | 29/847 |
| 6,985,279 | B1 * | 1/2006 | Fu | 359/291 |
| 6,995,495 | B2 * | 2/2006 | Ko et al. | 310/309 |
| 7,062,970 | B2 * | 6/2006 | Higuchi | 73/504.12 |
| 7,161,274 | B2 * | 1/2007 | Tsuboi et al. | 310/309 |
| 7,301,689 | B2 * | 11/2007 | Fu | 359/290 |
| 2004/0122328 | A1 | 6/2004 | Wang et al. | |
| 2004/0155556 | A1 | 8/2004 | Onoda et al. | |
| 2006/0082250 | A1 * | 4/2006 | Ko et al. | 310/309 |

FOREIGN PATENT DOCUMENTS

| | | |
|---|---|---|
| JP | 2005-099760 | 4/2005 |
| JP | 2005-137102 | 5/2005 |
| JP | 2005-143235 | 6/2005 |

OTHER PUBLICATIONS

Kurt E. Peterson, "Silicon Torsional Scanning Mirror", IBM J. Res. Develop., vol. 24, No. 5, pp. 631-637 (1980).

* cited by examiner

*Primary Examiner*—Burton Mullins
(74) *Attorney, Agent, or Firm*—Harness, Dickey & Pierce, P.L.C.

(57) ABSTRACT

An actuator having a rotation central axis includes: an insulative frame; movable comb electrodes having first electrode teeth; a movable portion between the movable comb electrodes; supporting portions on the frame supporting the movable comb electrodes and the movable portion; fixed comb electrodes on the frame corresponding to the movable comb electrodes and provided with second electrode teeth; first elastic connecting portions connecting the movable comb electrodes to the supporting portions so each movable comb electrode can rotate around the rotation central axis; and second elastic connecting portions connecting the movable portion to the movable comb electrodes so that the movable portion can rotate around the rotation central axis. Each movable comb electrode is driven by an alternating voltage between each fixed comb electrode and movable comb electrode. Part of the first electrode teeth overlaps part of the second electrode teeth when no alternating voltage is applied.

20 Claims, 10 Drawing Sheets

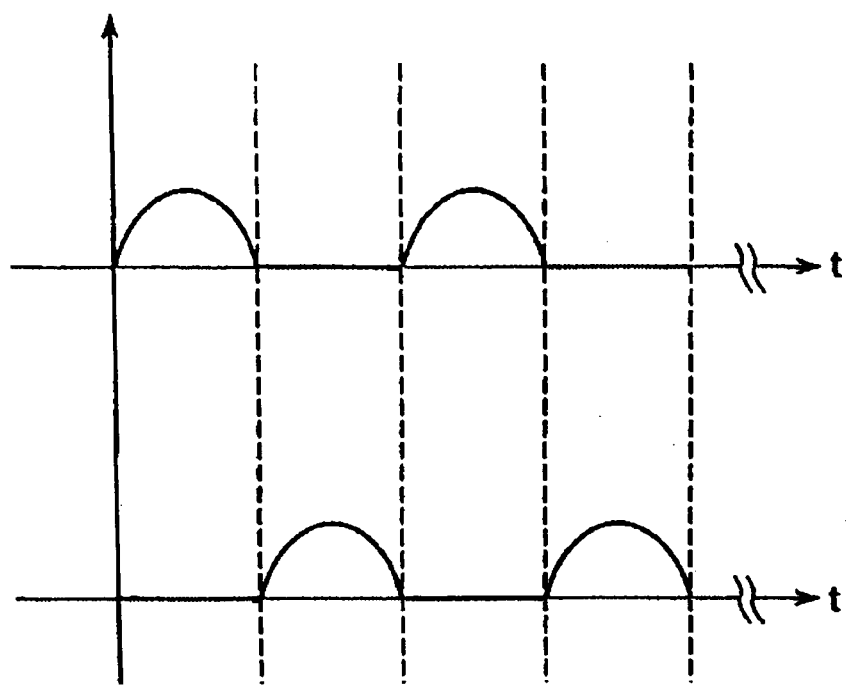
Fig. 5A
Fig. 5B
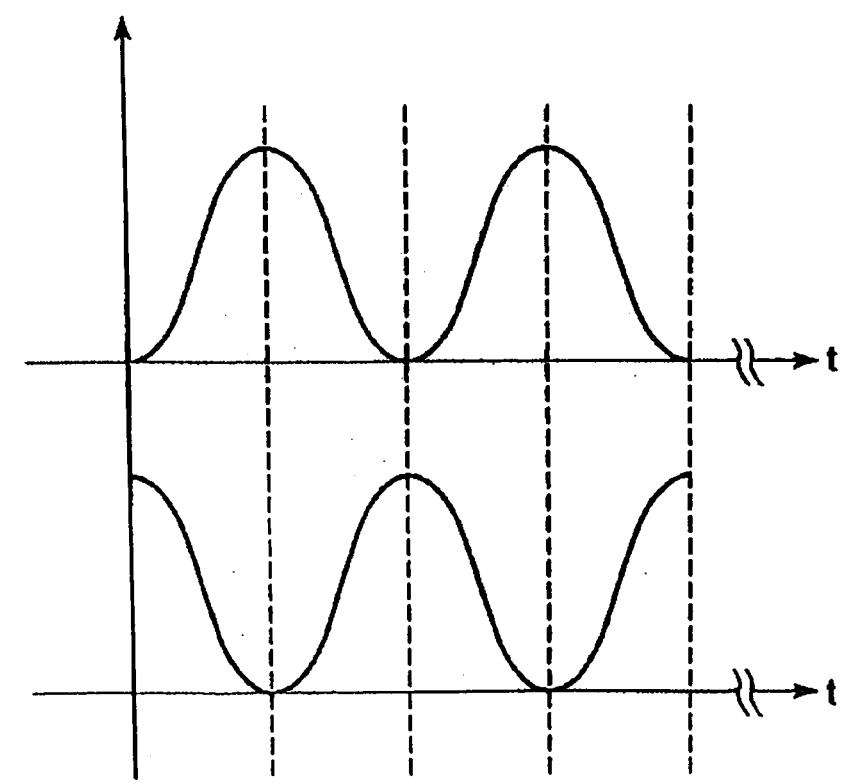
Fig. 5C
Fig. 5D

ACTUATOR

CROSS-REFERENCE TO RELATED APPLICATION

This application claims priority to Japanese Patent Application No. 2004-363607 filed Dec. 15, 2004, which is hereby expressly incorporated by reference herein in its entirety.

BACKGROUND OF THE INVENTION

1. Field of the Invention

The present invention relates to an actuator, and in particular relates to an actuator of the type employing a two-degree-of-freedom vibration system.

2. Description of the Prior Art

There is known a polygon mirror (rotary polyhedron) as an actuator provided in laser printers, for example. In such a printer, in order to achieve higher-resolution and higher-quality printed output as well as higher-speed printing, it is necessary to rotate the polygon mirror at higher speed. Currently, an air bearing is used to rotate the polygon mirror at high speed with stability. However, there is a problem in that it is difficult to rotate the polygon mirror at much higher speed than the speed available at the present. Further, although a larger motor is required in order to rotate the polygon mirror at higher speed, use of such a larger motor gives rise to a problem in that it is difficult to miniaturize the size of an apparatus in which the polygon mirror is used. Furthermore, use of such a polygon mirror gives rise to another problem in that the structure of the apparatus becomes necessarily complicated, thus leading to increased manufacturing cost.

On the other hand, a single-degree-of-freedom torsional vibrator as shown in FIG. 10 has been proposed since the early stages of research in the field of actuators. Since this vibrator uses flat electrodes which are arranged in parallel with each other, it can have quite simple structure (see K. E. Petersen: "Silicon Torsional Scanning Mirror", IBMJ. Res. Develop., Vol. 24 (1980), P. 631, for example). Further, a single-degree-of-freedom electrostatic drive type vibrator obtained by modifying the torsional vibrator described above so as to have a cantilever structure has also been proposed (see Kawamura et al. "Research in micromechanics using Si", Proceedings of the Japan Society for Precision Engineering Autumn Conference (1986), P. 753, for example).

FIG. 10 shows such a single-degree-of-freedom electrostatic drive type torsional vibrator. In the torsional vibrator shown in FIG. 10, a movable electrode plate 300 made of monocrystalline silicon is fixed at end fixing portions 300a thereof to the both ends of a glass substrate 1000 through spacers 200. The movable electrode plate 300 includes a movable electrode portion 300c which is supported by the end fixing portions 300a through narrow torsion bars 300b. Further, a fixed electrode 400 is provided on the glass substrate 1000 so as to be opposed to the movable electrode portion 300c through a predetermined electrode interval. Specifically, the fixed electrode 400 is arranged in parallel with the movable electrode portion 300c through the electrode interval therebetween. The fixed electrode 400 is connected to the movable electrode plate 300 via a switch 600 and a power source 500.

In the torsional vibrator having the structure described above, when a voltage is applied across the movable electrode portion 300c and the fixed electrode 400, the movable electrode portion 300c rotates around the axis of the torsion bars 300b due to electrostatic attraction. Since electrostatic attraction is inversely proportional to the square of an electrode interval, it is preferable for this type of electrostatic actuator to have a small electrode interval between the movable electrode portion 300c and the fixed electrode 400. However, in such a single-degree-of-freedom torsional vibrator described above, the movable electrode portion 300c which serves as a movable portion is also provided with the electrode. Therefore, if the electrode interval becomes too small, a movable range (rotational angle) of the movable electrode portion 300c is necessarily limited. On the other hand, in order to enlarge the movable range of the movable electrode portion 300c, it is necessary to widen the electrode interval and this in turn needs a large driving voltage. Namely, such a single-degree-of-freedom torsional vibrator described above involves a problem in that it is difficult to achieve both of low-voltage driving and large displacement.

SUMMARY OF THE INVENTION

It is therefore an object of the invention to provide an actuator with a movable portion which can drive at low voltage to operate large torque in which the movable portion can displace (or rotate) with a large rotational angle or large deflection angle.

In order to achieve the object, the invention is directed to an actuator having a rotation central axis. In one embodiment of the invention, the actuator includes:

a frame having an insulative property;

a pair of movable comb electrodes spaced apart from each other, each of the pair of movable comb electrodes having a side surface and being provided with at least one set of first electrode teeth which are arranged side by side with a predetermined interval on the side surface thereof;

a movable portion provided between the pair of movable comb electrodes;

a pair of supporting portions provided on the frame for supporting the pair of movable comb electrodes and the movable portion;

at least one pair of fixed comb electrodes provided on the frame at the positions which respectively correspond to the pair of movable comb electrodes, each of the at least one pair of fixed comb electrodes being provided with one set of second electrode teeth which are arranged side by side with a predetermined interval so as to be cooperatively associated with the first electrode teeth of the corresponding movable comb electrode;

at least one pair of first elastic connecting portions which respectively connect the pair of movable comb electrodes to the pair of supporting portions so that each of the movable comb electrodes can rotate around the rotation central axis of the actuator with respect to the corresponding supporting portion; and at least one pair of second elastic connecting portions which respectively connect the movable portion to the pair of movable comb electrodes so that the movable portion can rotate around the rotation central axis of the actuator in accordance with the rotation of the movable comb electrodes, wherein each of the pair of movable comb electrodes is driven by means of Coulomb force generated by applying an alternating voltage between each of the fixed comb electrodes and the corresponding movable comb electrode, whereby the movable portion rotate, and wherein the first electrode teeth of each of the pair of movable comb electrodes and the second electrode teeth of each of the corresponding at least one pair of fixed comb electrodes are configured so that at least a part of the first electrode teeth of each of the movable comb electrodes overlaps with a part of the second electrode teeth of the corresponding fixed comb electrode in a state where no alternating voltage is applied therebetween.

Since each of the at least one pair of fixed comb electrodes is adjacent to the corresponding movable comb electrode, it is possible to drive the actuator at low voltage and to operate the movable comb electrodes with large torque. In addition, it is possible to obtain an actuator capable of displacing (or rotating) the movable portion with a large rotational angle (deflection angle). Further, since the actuator is provided with the frame, it is possible to reinforce (and strengthen) the intensity of the actuator.

In the actuator according to the invention, it is preferred that at least a part of the first electrode teeth of each of the movable comb electrodes overlaps with a part of the second electrode teeth of the corresponding fixed comb electrode in a state where no alternating voltage is applied therebetween when viewed from the rotation central axis of the actuator.

This makes it possible to rotate the movable comb electrodes easily, and it is possible to drive the actuator at low voltage.

In the actuator according to the invention, it is preferred that one of the tip of each of the first electrode teeth and the tip of each of the second electrode teeth completely overlaps with the other.

This makes it possible to improve the drive efficiency of the actuator and to drive it at low voltage. Further, it is possible to generate larger torque.

In the actuator according to the invention, it is preferred that each of the first electrode teeth has a first width in a direction perpendicular to the frame and each of the second electrode teeth has a second width in a direction perpendicular to the frame, in which the first width of each of the first electrode teeth is larger than the second width of each of the second electrode teeth when viewed from the rotation central axis of the actuator.

This makes it possible to vibrate (rotate) the movable comb electrodes while maintaining the intensity of the movable comb electrodes. Thus, it is possible to make the life of the actuator longer.

In the actuator according to the invention, it is preferred that, in the case where the first width of each of the first electrode teeth is defined as A (μm) and the second width of each of the second electrode teeth is defined as B (μm), then A and B satisfy the relation: $1.0 \leq A/B \leq 3.0$.

This makes it possible to improve the drive efficiency of the actuator, and therefore it is possible to drive the actuator at low voltage.

In the actuator according to the invention, it is preferred that each of the first electrode teeth has upper and lower edges in the width direction thereof and each of the second electrode teeth has upper and lower edges in the width direction thereof, in which either the upper edge or the lower edge of each of the first electrode teeth is substantially aligned with the corresponding edge of each of the second electrode teeth in a state where no alternating voltage is applied therebetween when viewed from the rotation central axis of the actuator.

This makes it possible to improve the drive efficiency of the actuator further, and therefore it is possible to drive the actuator at low voltage.

In the actuator according to the invention, it is preferred that the at least one pair of fixed comb electrodes and the pair of movable comb electrodes are formed by subjecting a first base material to predetermined processes.

This makes it possible to obtain such a structure in which the fixed comb electrodes and the movable comb electrodes are formed easily.

In the actuator according to the invention, it is preferred that the pair of supporting portions, the movable portion, the at least one pair of first elastic connecting portions and the at least one pair of second elastic connecting portions are formed by subjecting a base material common to the first base material to predetermined processes.

This makes it possible to obtain such a structure in which the supporting portions, the movable portion, the first elastic connecting portions, and the second elastic connecting portions are formed easily.

In the actuator according to the invention, it is preferred that the at least one pair of fixed comb electrodes and the pair of movable comb electrodes are separately formed by subjecting the first base material to patterning so that each of the at least one set of first electrode teeth does not come into contact with the corresponding second tooth.

This makes it possible to manufacture the movable comb electrodes and the fixed comb electrodes each having a desired shape and size with precision.

In the actuator according to the invention, it is preferred that the first base material is formed of silicon.

This makes it possible to form such a structure having conductivity. Further, it is possible to obtain the movable portion capable of stably driving easily.

In the actuator according to the invention, it is preferred that the frame is constructed from a laminated structure which comprises an intermediate layer formed of silicon oxide and a second base material formed of silicon and laminated on the intermediate layer.

This makes it possible to form the actuator having such a structure easily.

In the actuator according to the invention, it is preferred that the frame is provided with an opening at a portion corresponding to the movable portion and/or the pair of movable comb electrodes.

Thus, it is possible to prevent the movable portion and/or the movable comb electrodes from bringing into contact with the frame when the movable portion and/or the movable comb electrodes are displaced (or rotate).

In the actuator according to the invention, it is preferred that each of the pair of movable comb electrodes has an electrode base and the at least one set of first electrode teeth, and the at least one set of first electrode teeth are provided at one end of the electrode base of each of the pair of movable comb electrodes in a direction substantially perpendicular to the rotation central axis.

This makes it possible to displace the movable comb electrodes effectively.

In the actuator according to the invention, it is preferred that the at least one set of first electrode teeth include two sets of first electrode teeth, in which each set of the two sets of first electrode teeth is respectively provided at both ends of the electrode base of each of the pair of movable comb electrodes in a direction substantially perpendicular to the rotation central axis.

This makes it possible to operate the movable comb electrodes with further larger torque.

In the actuator according to the invention, it is preferred that one or more through-hole is formed in each of the pair of movable comb electrodes.

Thus, since it is possible to reduce the mass of each of the movable comb electrodes, the actuator can drive with a high speed (that is, with a high frequency).

In the actuator according to the invention, it is preferred that the actuator further includes a light reflecting portion provided on the movable portion.

Although the actuator of the invention can be applied to various types of apparatuses, it is preferable that the actuator of the invention is applied to an optical scanner, for example. In such a case, it is possible to change a light path of the light emitted to the actuator provided with the light reflecting portion.

In the actuator according to the invention, it is preferred that, in the case where the spring constant of the first elastic connecting portion is defied as $k_1$ and the spring constant of the second elastic connecting portion is defined as $k_2$, $k_1$ and $k_2$ satisfy the relation: $k_1 > k_2$.

This makes it possible to enlarge the deflection angle (rotational angle) of the movable portion further while suppressing the deflection angle of each of the movable comb electrodes.

In the actuator according to the invention, it is preferred that the actuator of the type employs a two-degree-of-freedom vibration system, and the frequency of the alternating voltage is set so as to be substantially the same as a lower resonance frequency of resonance frequencies of the two-degree-of-freedom vibration system at which the pair of movable comb electrodes and the movable portion resonate.

Thus, it is possible to provide the actuator capable of operating at low voltage with a high speed and a large deflection angle (amplitude). Further, by having such a structure, it is possible to enlarge the rotational angle (deflection angle) of the movable portion while preventing the amplitude of each of the movable comb electrodes.

In the actuator according to the invention, it is preferred that at least one of the pair of first elastic connecting portions and the pair of second elastic connecting portions includes a piezoresistive element.

Thus, it is possible to detect the rotational angle and rotational frequency of the movable portion, for example. Further, it is possible to use the detected results for control of the posture of the movable portion.

In another embodiment of the invention, an actuator having a rotation central axis includes:
- a frame having an insulative property;
- a movable comb electrode provided with one set of first electrode teeth which are placed side by side with a predetermined interval, the movable comb electrode having an opening;
- a movable portion provided in the opening of the movable comb electrode;
- a pair of supporting portions provided on the frame for supporting the movable comb electrode and the movable portion;
- two fixed comb electrodes provided on the frame at the positions which corresponds to the movable comb electrode in a direction substantially perpendicular to the rotation central axis, each of the two fixed comb electrodes being provided with one set of second electrode teeth which are arranged side by side with a predetermined interval so as to be cooperatively associated with the at least one set of first electrode teeth of the movable comb electrode;
- at least one pair of first elastic connecting portions which respectively connect the movable comb electrode to the pair of supporting portions so that the movable comb electrode can rotate around the rotation central axis of the actuator with respect to the pair of supporting portions; and
- at least one pair of second elastic connecting portions which respectively connect the movable portion to the movable comb electrode so that the movable portion can rotate around the rotation central axis of the actuator in accordance with the rotation of the movable comb electrode, wherein the movable comb electrode is driven by means of Coulomb force generated by applying an alternating voltage between each of the fixed comb electrodes and the movable comb electrode, whereby the movable portion rotate, and wherein the first electrode teeth of the movable comb electrode and the second electrode teeth of each of the fixed comb electrodes are configured so that at least a part of the first electrode teeth of the movable comb electrode overlaps with a part of the second electrode teeth of each of the fixed comb electrodes in a state where no alternating voltage is applied therebetween.

BRIEF DESCRIPTION OF THE DRAWINGS

The foregoing and other objects, features and advantages of the invention will become more readily apparent from the following detailed description of preferred embodiments of the invention which proceeds with reference to the appending drawings.

FIG. 5 is a drawing which shows an example of the alternating voltage to be applied to the actuator shown in FIG. 1.

DETAILED DESCRIPTION OF THE INVENTION

Hereinafter, preferred embodiments of an actuator according to the invention will be described with reference to the appended drawings.

FIRST EMBODIMENT

Figure 1:
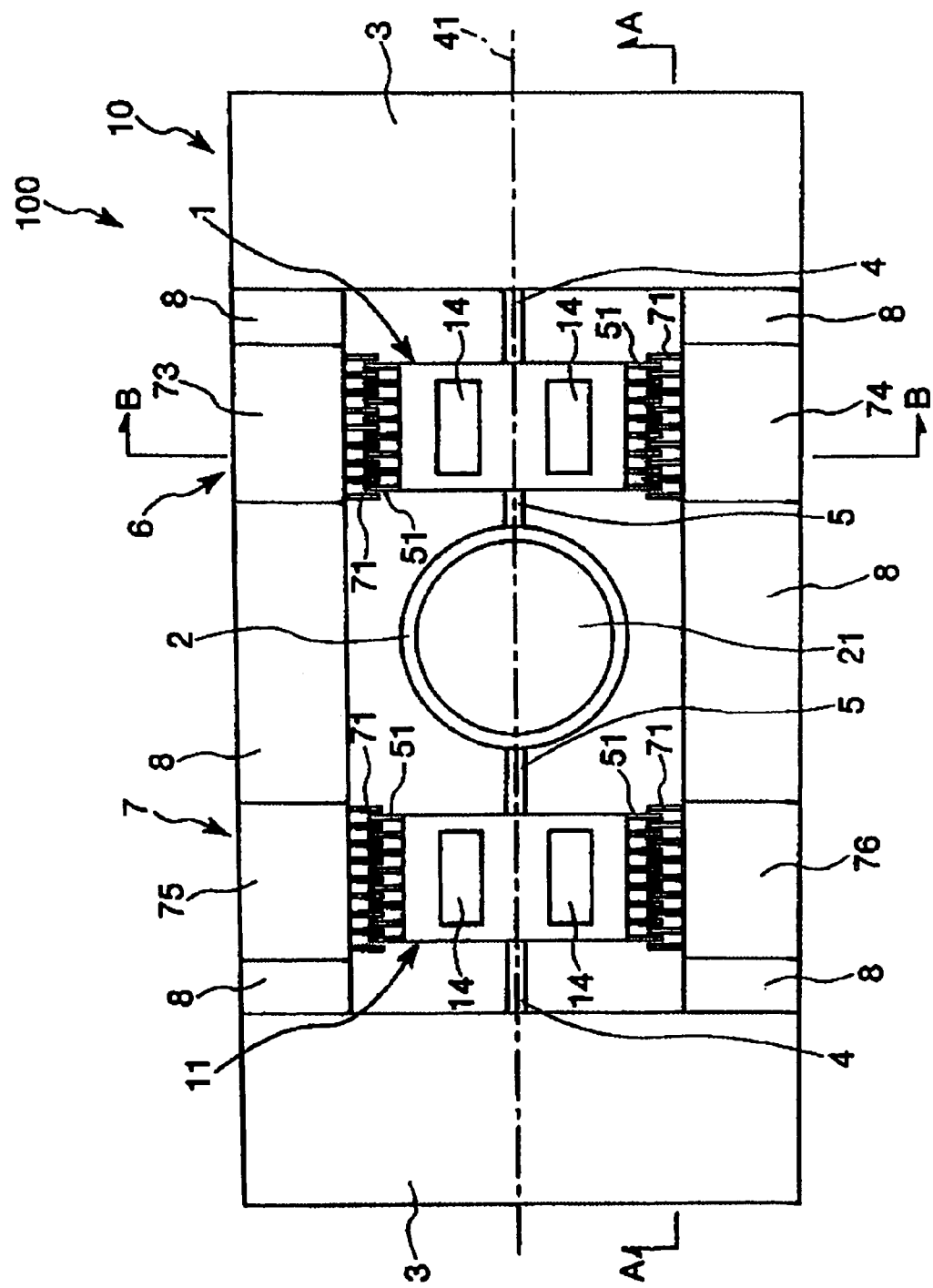
FIG. 1 is a plan view which shows a first embodiment of the actuator according to the invention.
Figure 2:
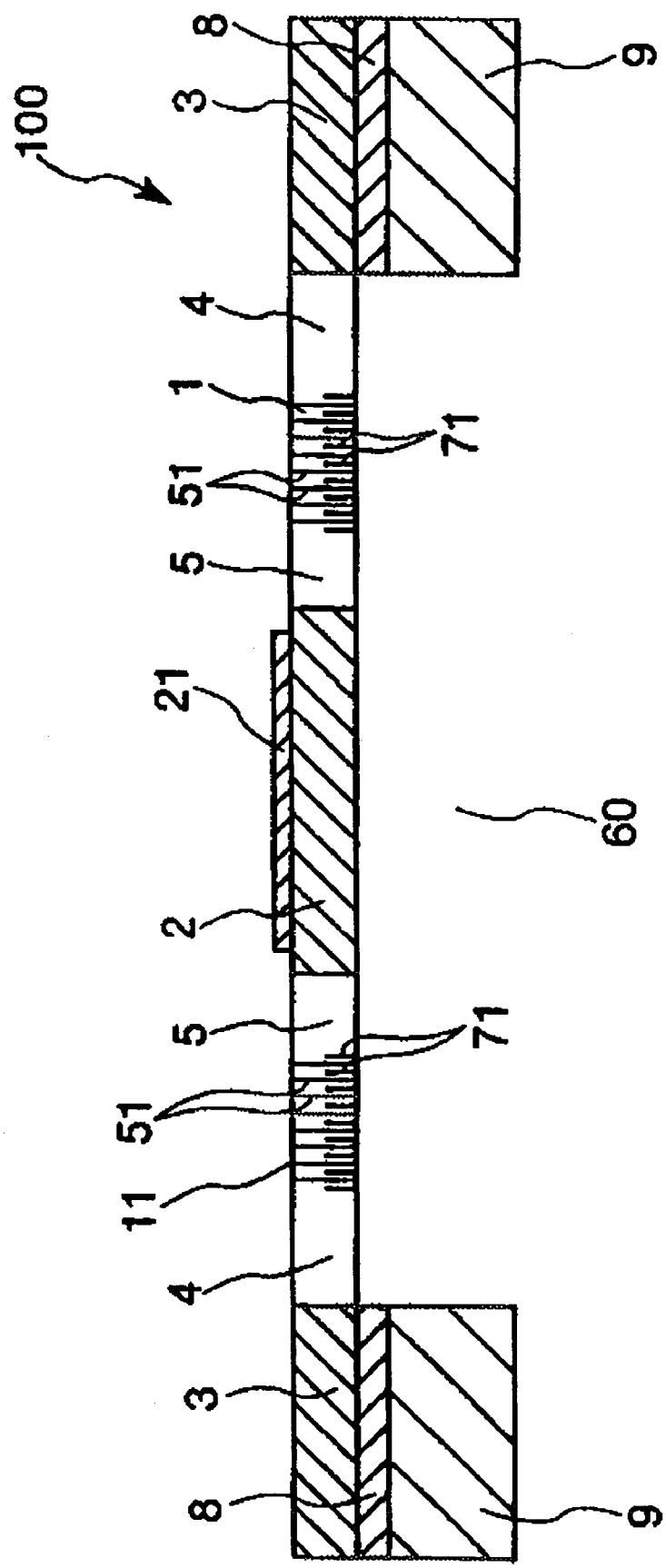
FIG. 2 is a cross-sectional view taken along line A-A in FIG. 1.
Figure 3:
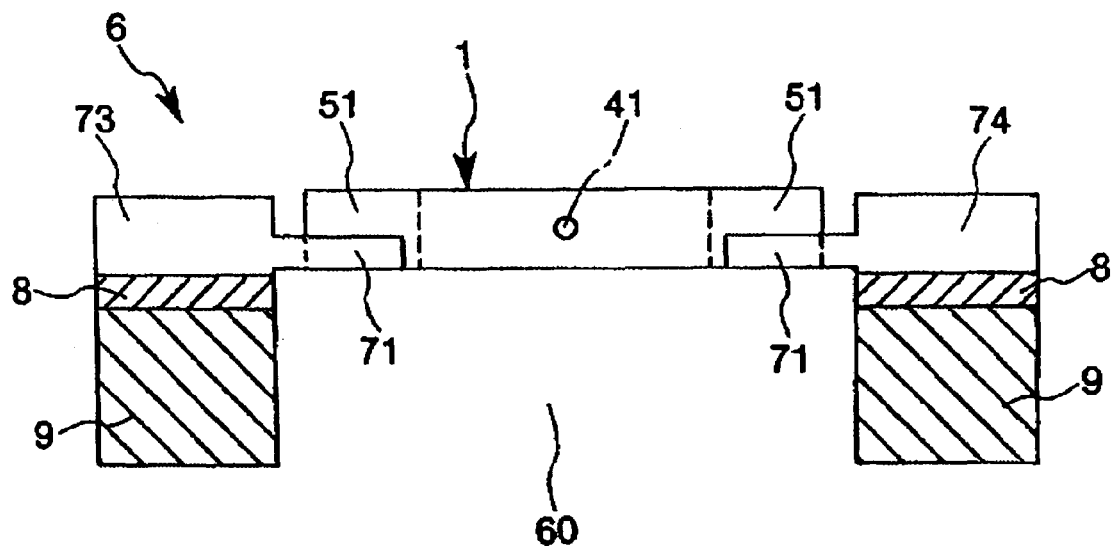
FIG. 3 is a cross-sectional view taken along line B-B in FIG. 1.

First, a first embodiment of the actuator according to the invention will be described. FIG. 1 is a plan view which shows a first embodiment of the actuator according to the invention. FIG. 2 is a cross-sectional view taken along line A-A in FIG. 1. FIG. 3 is a cross-sectional view taken along line B-B in FIG. 1. In the following description using FIG. 1, for convenience of description, it is to be noted that the upper side, the lower side, the right side and the left side in FIG. 1 will be referred to as the "upper side", "lower side", "right side" and the "left side", respectively.

As shown in FIGS. 1 and 2, an actuator 100 includes: a pair of movable comb electrodes (first mass portions) 1 and 11; a movable portion (second mass portion) 2; a pair of supporting portions 3 for supporting the movable portion 2 and the movable comb electrodes 1, 11; four fixed comb electrodes 73, 74, 75 and 76 provided so as to correspond to the pair of movable comb electrodes 1, 11; and a frame including a insulative portion (supporting substrate) 8 and a lower substrate 9.

In the actuator 100, as shown in FIG. 1, the movable portion 2 is positioned at the center thereof, and the movable comb electrodes 1, 11 are provided at one end side (right side in FIG. 1) and the other side (left side in FIG. 1) of the movable portion 2, respectively. Namely, the movable comb electrodes 1, 11 are provided at both sides of the movable portion 2, respectively. The movable comb electrodes 1, 11 have substantially the same shape and size, and are arranged in substantially (line) symmetrical manner with respect to the movable portion 2.

Further, as shown in FIG. 1, one or more through-hole 14 is formed in each of the movable comb electrodes 1, 11. In an example shown in FIG. 1, two through-holes 14 are formed in each of the movable comb electrodes 1, 11. In this regard, the shape or the size of the through-hole 14 when viewed from above the upper side in FIG. 2 is appropriately set depending on a drive frequency of the movable portion 2 as a target.

Moreover, one supporting portion 3 is arranged at the right side of the movable comb electrode 1 in FIG. 1, while the other supporting portion 3 is arranged at the left side of the movable comb electrode 11 in FIG. 1.

Two fixed comb electrodes 73, 74 are provided at positions corresponding to the movable comb electrode 1. In other words, the fixed comb electrode 73 is arranged at the upper side of the movable comb electrode 1 in FIG. 1, while the fixed comb electrode 74 is arranged at the lower side of the movable comb electrode 1 in FIG. 1.

In a similar manner, two fixed comb electrodes 75, 76 are provided at positions corresponding to the movable comb electrode 11. In other words, the fixed comb electrode 75 is arranged at the upper side of the movable comb electrode 11 in FIG. 1, while the fixed comb electrode 76 is arranged at the lower side of the movable comb electrode 11 in FIG. 1.

In this case, the movable comb electrode 1 and the two fixed comb electrodes 73, 74 constitute one set of comb electrodes 6, while the movable comb electrode 11 and the two fixed comb electrodes 75, 76 constitute one set of comb electrodes 7. Namely, the actuator 100 is provided with two sets of come electrodes 6, 7.

On the upper surface of the movable portion 2 of the present embodiment, there is provided a light reflecting portion 21 for reflecting incident light effectively.

Further, as shown in FIG. 1, the actuator 100 includes a pair of first elastic connecting portions 4, 4 and a pair of second elastic connecting portions 5, 5. The pair of first elastic connecting portions 4, 4 connect the movable comb electrodes 1, 11 to the supporting portions 3, 3, respectively, so that each of the movable comb electrodes 1, 11 can rotate with respect to the corresponding supporting portion 3. The pair of second elastic connecting portions 5, 5 connect the movable portion 2 to the movable comb electrodes 1, 11, respectively, so that the movable portion 2 can rotate in accordance with the rotation of the movable comb electrodes 1, 11. In other words, the movable portion 2 is connected to the movable comb electrodes 1, 11 via the second elastic connecting portions 5, 5, respectively, and the movable comb electrodes 1, 11 are connected to the supporting portions 3, 3 via the first elastic connecting portions 4, 4, respectively. In this case, the rotation central axis of each of the first elastic connecting portions 4, 4 and the rotation central axis of each of the second elastic connecting portions 5, 5 are coaxially provided to constitute a central axis for the rotation of the movable comb electrodes 1, 11 and the movable portion 2 (that is, rotational axis) 41.

It is preferable that the movable comb electrodes 1, 11, the movable portion 2, the supporting portions 3, 3, the first elastic connecting portions 4, 4, and the second elastic connecting portions 5, 5 are formed as one unit.

The movable comb electrodes 1, 11, the movable portion 2, the supporting portions 3, 3, the first elastic connecting portions 4, 4, the second elastic connecting portions 5, 5, and the fixed comb electrodes 73, 74, 75 and 76 are formed by subjecting a common base material (first base material) to predetermined processes to constitute a structure 10.

The structure 10 has conductivity, and is formed of silicon or the like, for example.

As shown in FIGS. 2 and 3, each of the supporting portions 3, 3 and the fixed comb electrodes 73, 74, 75 and 76 are bonded (fixed) to the lower substrate 9 via the insulative portion (supporting substrate) 8 having insulative property, and supported by the insulative portion 8 and the lower substrate 9.

The insulative portion 8 is formed of, for example, silicon oxide, silicon nitride, silicon oxynitride or the like. Further, the lower substrate 9 is formed of, for example, silicon or the like.

As shown in FIGS. 2 and 3, the insulative portion 8 and the lower substrate 9 have an opening 60. The opening 60 is provided at a position corresponding to the movable comb electrodes 1, 11 and the movable portion 2. The opening 60 functions as an escape portion for preventing the lower substrate 9 from being contact with the movable portion 2 when the movable portion 2 rotates. By providing the opening (escape portion) 60, it is possible to set the deflection angle (amplitude) of the movable portion 2 to larger while preventing the whole actuator 100 from being made larger.

Figure 4:
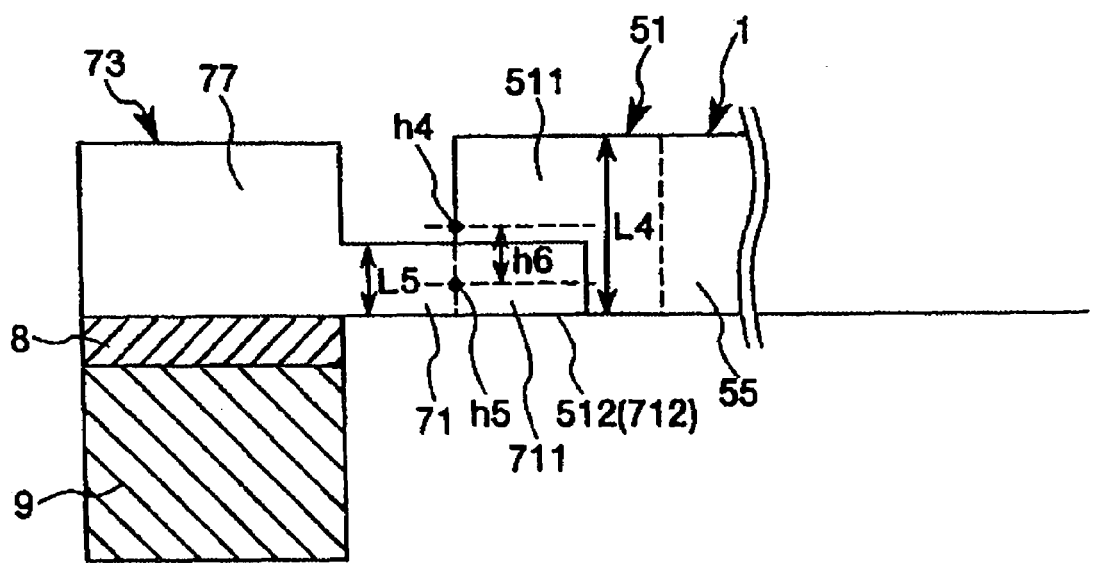
FIG. 4 is an enlarged cross-sectional view of a part of the first and second electrode teeth shown in FIG. 2.

FIG. 4 is an enlarged cross-sectional view of a part of the first and second electrode teeth shown in FIG. 2. In the following description using FIG. 4, for convenience of description, it is to be noted that the upper side, the lower side, the right side and the left side in FIG. 1 will be referred to as the "upper side", "lower side", "right side" and the "left side", respectively.

Hereinafter, a description will be given for the comb electrodes 6, 7 in detail with reference to FIGS. 1 and 4. However, since the configuration of the comb electrode 6 is similar to the configuration of the comb electrode 7, a description will be typically given for the comb electrode 6 in the following.

Further, since the configuration of the fixed comb electrode 73 is similar to the configuration of the fixed comb electrode 74, the configuration and relation of the fixed comb electrode 73 and the movable comb electrode 1 will be typically described.

As shown in FIG. 4, the movable comb electrode 1 is provided with a movable electrode (electrode base) 55, and a plurality of electrode teeth (at least one set of first electrode teeth) 51 formed on the electrode base 55 at one end in a direction substantially perpendicular to the rotation central axis 41 and arranged side by side with a predetermined interval on the side surface of the electrode base 55 (in a right-and-left direction in FIG. 1).

Further, the fixed comb electrode 73 is provided with a fixed electrode (electrode base) 77, and a plurality of electrode teeth (second electrode teeth) 71 formed on the electrode base 77 and arranged side by side with a predetermined interval on the side surface of the electrode base 77 (in a right-and-left direction in FIG. 1) so as to be cooperatively associated with the (one set of) first electrode teeth 51 of the movable comb electrode 1.

As shown in FIG. 1, the plurality of (that is, two sets of) first electrode teeth 51 are arranged at both end sides of the movable comb electrode 1 in a direction substantially perpendicular to the rotation central axis 41, that is, the two sets of first electrode teeth 51 are arranged at upper and lower sides of the movable comb electrode 1 in FIG. 1. Further, each of the second electrode teeth 71 are positioned between corresponding adjacent two first electrode teeth 51 with a predetermined interval when viewed from above the actuator 100. In other words, the second electrode teeth 71 and the first electrode teeth 51 are alternately arranged so as to engage with each other.

As shown in FIG. 4, the width (the length thereof in the up-and-down direction in FIG. 4) of the electrode base 55 and the width of the electrode base 77 are formed so as to be substantially the same as each other. The upper surface of the electrode base 55 substantially corresponds with the upper surface of the electrode base 77 in a state where no alternating voltage is applied therebetween. Similarly, the lower surface of the electrode base 55 substantially corresponds with the lower surface of the electrode base 77.

Further, the width of each of the first electrode teeth 51 (the length thereof in the up-and-down direction in FIG. 4) is formed so as to be equal to the width of the electrode base 55.

On the other hand, the width of each of the second electrode teeth 71 (the length thereof in the up-and-down direction in FIG. 4) is formed so as to be smaller than the width of the electrode base 77. Namely, in the case where the width of each of the first electrode teeth 51 is defined as L4 and the width of each of the second electrode teeth 71 is defined as L5, then L4 and L5 satisfy the relation: L4<L5.

In this case, as shown in FIG. 4, the tip 511 of each of the first electrode teeth 51 completely overlaps with the tip 711 of each of the second electrode teeth 71 in a state where no alternating voltage is applied therebetween when viewed from the rotation central axis 41 (hereinafter, also referred to as "axis direction"). More specifically, the tip 511 and the tip 711 overlaps so that the position of a lower surface 512 of the electrode base 51 (one end in the width direction thereof) substantially corresponds with the position of a lower surface 712 of the electrode base 71 (one end in the width direction thereof). Thus, it is possible to enlarge the distance h6 between the midpoint h4 of the length of each of the first electrode teeth 51 in the width direction thereof and the midpoint h5 of the length of each of the first electrode teeth 71 in the width direction thereof. Therefore, it is possible to drive the actuator 100 at low voltage, and to enlarge the rotational angle (deflection angle) of the movable comb electrode 1.

In this regard, it is preferable that, in the case where the width (first width) L4 of each of the first electrode teeth 51 is defined as A (μm) and the width (second width) L5 of each of the second electrode teeth 71 is defined as B (μm), then A and B satisfy the relation: $1.0 \leq A/B \leq 3.0$. More preferably, A and B satisfy the relation: $1.2 \leq A/B \leq 2.0$. This makes it possible to improve the drive efficiency of the actuator 100, and it is possible to drive the movable comb electrode 1 at low voltage.

In the actuator 100, by adjusting the width, interval, thickness and the like of each of the first and second electrode teeth 51 and 71, it is possible to set the drive property of the actuator 100 to desired one.

The actuator 100 having the structure as described above constitutes a two-degree-of-freedom vibration type actuator which has two vibration system in which the movable comb electrodes 1, 11 and the first elastic connecting portions 4, 4 constitute a first vibration system, and the movable portion 2 and the second elastic connecting portions 5, 5 constitute a second vibration system.

Next, the operation of the actuator 100 in the present embodiment will be described.

FIG. 5 is a drawing which shows an example of the the like, for example, is applied between each of the movable alternating voltage to be applied to the actuator shown in FIG. 1. Such an actuator 100 drives as follows.

Namely, a sinusoidal wave (alternating voltage) or comb electrodes 1, 11 and the corresponding fixed comb electrodes 73, 74, 75 and/or 76, more specifically, for example, the movable comb electrodes 1, 11 are connected to ground, and a voltage signal having a waveform of a single-phase half-wave rectification as shown in FIG. 5A is applied to the two fixed comb electrodes 73, 75 at the upper side in FIG. 1 and a voltage signal having a waveform as shown in FIG. 5B, which is out of phase with the waveform as shown in FIG. 5A by 180 degrees, is applied to the two fixed comb electrodes 74, 76 at the lower side in FIG. 1. Thus, Coulomb force (electrostatic force) is generated between the movable comb electrodes 1, 11 and the corresponding electrodes 73 and 74, 75 and 76, respectively. The intensity of the Coulomb force which attracts the movable comb electrode 1 to the fixed comb electrode 73 or 74 and the intensity of the Coulomb force which attracts the movable comb electrode 11 to the fixed comb electrode 75 or 76 vary depending on the change in the phase of the sinusoidal wave. Each of the movable comb electrodes 1, 11 vibrate (rotate) around the rotation central axis 41 with respect to the first elastic connecting portions 4, 4. The movable portion 2 connected to the movable comb electrodes 1, 11 via the second elastic connecting portions 5, 5 vibrates (rotates) around the rotation central axis 41 in accordance with the rotation (displacement) of the movable comb electrodes 1, 11.

As described above, according to the actuator 100 in the first embodiment, since the fixed comb electrodes 73 and 74, 75 and 76 respectively come close to the movable comb electrode 1, 11, it is possible to obtain the actuator 100 in which the movable comb electrodes 1, 11 can be driven at low voltage, and a greater torque is exerted on the movable comb electrodes 1, 11 with a large rotational angle (deflection angle) of the movable portion 2.

Further, since the phase and amplitude of the voltage applied to the fixed comb electrodes 73 and 75 are substantially the same as the phase and amplitude of the voltage applied to the fixed comb electrodes 74 and 76, it is possible to vibrate (rotate) the movable comb electrodes 1, 11 synchronously. This makes it possible to drive the movable portion 2 stably.

Moreover, since the actuator 100 is driven using the comb electrodes 6, 7, the Coulomb force (driving force) applied to the movable comb electrodes 1, 11 is never reduced in spite of provision of the through-hole 14. In this case, since it is possible to reduce the mass of the movable comb electrodes 1, 11, it is possible to drive the movable comb electrodes 1, 11 (and the movable portion 2) with a high speed (that is, high frequency). Furthermore, since it is possible to reduce the moment of inertia $J_1$ of the movable comb electrodes 1, 11, it is possible to enlarge the rotational angle (deflection angle) of the movable portion 2 further.

In this regard, the moment of inertia $J_1$ of the movable comb electrodes 1, 11 will be described later.

In this regard, the length (distance) between the rotation central axis 41 on the movable comb electrode 1 and one end portion 12 of the movable comb electrode 1 in a direction substantially perpendicular to the rotation central axis 41 is defined as L1, the length (distance) between the rotation central axis 41 on the movable comb electrode 11 and an end portion 12 of the movable comb electrode 11 in a direction substantially perpendicular to the rotation central axis 41 is defined as L2, and the length (distance) between the rotation central axis 41 on the movable portion 2 and an end portion 13 of the movable portion 2 in a direction substantially perpendicular to the rotation central axis 41 is defined as L3. Since the movable comb electrodes 1, 11 are provided independently of each other in the present embodiment, the movable comb electrodes 1, 11 do not interfere in the movable portion 2. Thus, it is possible to make the lengths L1 and L2 smaller regardless of the size of the movable portion 2 (that is, the length L3). This makes it possible to enlarge the rotational angle (deflection angle) of each of the movable comb electrodes 1, 11, and therefore it is possible to enlarge the rotational angle of the movable portion 2.

In this case, it is preferable that the maximum deflection angle of the movable portion 2 is set so as to become 20° or more.

Therefore, it is possible to realize (achieve) the low-voltage driving for the movable comb electrodes 1, 11 and the displacement (rotation) of the movable portion 2 with a large rotational angle.

For example, in the case where such an actuator 100 described above is applied to an optical scanner used in apparatuses such as laser printer, confocal scanning laser microscope, it is possible to make the apparatus smaller more easily.

In this regard, as mentioned above, although the lengths L1 and L2 are set so as to have substantially the same size in the present embodiment, it is no wonder that the length L1 may be different from the length L2.

Figure 6:
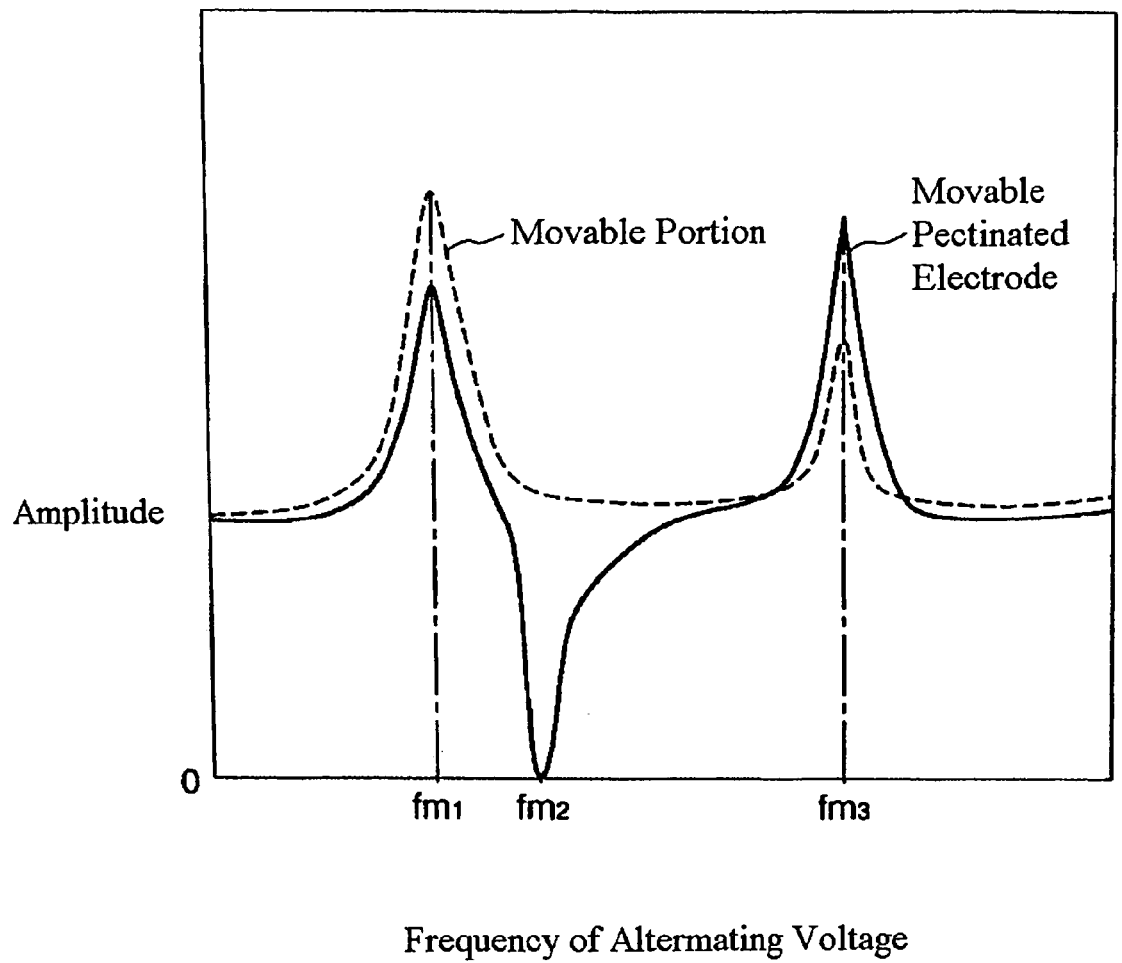
FIG. 6 is a graph which shows the frequency of an alternating voltage applied and the resonance curves of the movable comb electrodes and the movable portion.

FIG. 6 is a graph which shows the frequency of an alternating voltage applied and the resonance curves of the movable comb electrodes and the movable portion.

It should be noted that such a two-degree-of-freedom vibration type actuator 100 has a frequency characteristic as shown in FIG. 6 between the amplitudes (deflection angles) of the movable comb electrodes 1, 11 and the movable portion 2 and the frequency of the applied alternating voltage. Namely, the two-degree-of-freedom vibration system constituted from the first vibration system of the movable comb electrodes (first mass portions) 1, 11 and the first elastic connecting portions 4, 4, and the second vibration system of the movable portion (second mass portion) 2 and the second elastic connecting portions 5, 5 has two resonance frequencies $fm_1$ (kHz) and $fm_3$ (kHz) (where, $fm_1 < fm_3$) at which the amplitudes of the movable comb electrodes 1, 11 and the movable portion 2 become large, and one antiresonance frequency $fm_2$ (kHz) at which the amplitude of the movable comb electrodes 1, 11 becomes substantially zero.

In this actuator 100, it is preferable that the frequency F of an alternating voltage to be applied between each of the movable comb electrodes 1, 11 and the corresponding fixed comb electrodes 73, 74, 75 and 76 is set so as to be substantially the same as a lower resonance frequency of the two resonance frequencies, that is, the frequency F is set so as to be substantially the same as $fm_1$. By setting the frequency F (kHz) of the alternating voltage to be applied so as to be substantially the same as $fm_1$ (kHz), it is possible to increase the rotational angle (deflection angle) of the movable portion 2 while the vibration of the movable comb electrodes 1, 11 is suppressed. In this regard, it is to be noted that, in this specification, the fact that F (kHz) is substantially the same as $fm_1$ (kHz) means that F and $fm_1$ satisfy the relation: $(fm_1-1) \leq F \leq (fm_1+1)$ It is preferable that the average width of each of the movable comb electrode 1, 11 is in the range of 1 to 1,500 µm, and more preferably it is in the range of 10 to 300 µm. Similarly, it is preferable that the average width of the movable portion 2 is in the range of 1 to 1,500 µm, and more preferably it is in the range of 10 to 300 µm.

The spring constant of each of the first elastic connecting portions 4, 4 ($k_1$) is preferably in the range of $1 \times 10^{-4}$ to $1 \times 10^4$ Nm/rad, more preferably it is in the range of $1 \times 10^{-2}$ to $1 \times 10^3$ Nm/rad, further more preferably it is in the range of $1 \times 10^{-1}$ to $1 \times 10^2$ Nm/rad. By setting the spring constant of each of the first elastic connecting portions 4, 4 ($k_1$) to a value within the above range, it is possible to further increase the rotational angle (deflection angle) of the movable portion 2.

Similarly, the spring constant of each of the second elastic connecting portions 5, 5 ($k_2$) is preferably in the range of $1 \times 10^{-4}$ to $1 \times 10^4$ Nm/rad, more preferably it is in the range of $1 \times 10^{-2}$ to $1 \times 10^3$ Nm/rad, further more preferably it is in the range of $1 \times 10^{-1}$ to $1 \times 10^2$ Nm/rad. By setting the spring constant of each of the second elastic connecting portions 5, 5 ($k_2$) to a value within the above range, it is possible to further increase the rotational angle (deflection angle) of the movable portion 2 while the vibration of each of the movable comb electrodes 1, 11 is suppressed.

In the case where the spring constant of each of the first elastic connecting portions 4, 4 is defined as $k_1$, and the spring constant of each of the second elastic connecting portions 5, 5 is defined as $k_2$, it is preferred that $k_1$ and $k_2$ satisfy the relation: $k_1 > k_2$. This makes it possible to further increase the rotational angle (deflection angle) of the movable portion 2 while the vibration of each of the movable comb electrodes 1, 11 is suppressed.

Further, it is preferred that, in the case where the moment of inertia of each of movable comb electrodes 1, 11 is defined as $J_1$ and the moment of inertia of the movable portion 2 is defined as $J_2$, then $J_1$ and $J_2$ satisfy the relation: $J_1 \leq J_2$, and more preferably $J_1$ and $J_2$ satisfy the relation: $J_1 < J_2$. This makes it possible to further increase the rotational angle (deflection angle) of the movable portion 2 while the vibration of each of the movable comb electrodes 1, 11 is suppressed.

Now, the natural frequency of the first vibration system $\omega_1$ can be determined by the formula: $\omega_1 = (k_1/J_1)^{1/2}$ in the case where $J_1$ represents the moment of inertia of each of the movable comb electrodes 1, 11 and $k_1$ represents the spring constant of each of the first elastic connecting portions 4, 4. The natural frequency of the second vibration system $\omega_2$ can be determined by the formula: $\omega_2 = (k_2/J_2)^{1/2}$ in the case where $J_2$ represents the moment of inertia of the movable portion 2, and $k_2$ represents the spring constant of each of the second elastic connecting portions 5, 5.

It is preferable that the natural frequency of the first vibration system $\omega_1$ and the natural frequency of the second vibration system $\omega_2$ determined in such a manner described above satisfy the relation: $\omega_1 > \omega_2$. This makes it possible to further increase the rotational angle (deflection angle) of the movable portion 2 while the vibration of each of the movable comb electrodes 1, 11 is suppressed.

In this regard, in the actuator 100 of the present embodiment, it is preferred that the actuator 100 has a piezoresistive element in at least one of the pair of first elastic connecting portions 4, 4 and the pair of second elastic connecting portions 5, 5 thereof. This makes it possible to detect rotational angles and rotation frequencies, for example. Further, it is also possible to utilize the detection results to control the posture of the movable portion 2.

In this regard, in the present embodiment, even though it has been described that the alternating voltage having the waveform shown in FIG. 5A is applied to the fixed comb electrodes 73, 75 and the alternating voltage having the waveform shown in FIG. 5B is applied to the fixed comb electrodes

74, 76 as an example, the applied voltage is not limited thereto. For example, the alternating voltage having the waveform shown in FIG. 5C may be applied to the fixed comb electrodes 73, 75 and the alternating voltage having the waveform shown in FIG. 5D may be applied to the fixed comb electrodes 74, 76.

In this regard, the alternating voltage shown in FIG. 5C is the voltage of sinusoidal wave in which predetermined offset voltage is applied thereto and thus the minimum voltage is set to ground potential. Further, the alternating voltage shown in FIG. 5D is the voltage of sinusoidal wave which is out of phase with the waveform as shown in FIG. 5C by 180 degrees.

Further, in the actuator 100 of the present embodiment, even though it has been described that the movable comb electrode 1 and the fixed comb electrodes 73, 74 constitute one set of comb electrode 6, the invention is not limited thereto. For example, the movable comb electrode 1 and the fixed comb electrode 73 may constitute one set of comb electrode, or the movable comb electrode 1 and the fixed comb electrode 74 may constitute one set of comb electrode (much the same is true on the relation between the movable comb electrode 11 and the fixed comb electrodes 75, 76 and the comb electrode 7.). In this case, it is preferable that sinusoidal wave (alternating voltage) or the like to which offset voltage is applied in which the minimum voltage is the ground potential is applied between the movable comb electrode 1 and the fixed comb electrode 73 or 74.

Next, one example of a method of manufacturing the actuator 100 as shown in FIGS. 1 to 2 will be described with reference to the accompanying drawings. FIG. 7 is an example of a process drawing of a method of manufacturing the actuator. In this example, the actuator 100 is manufactured through the following steps.

In FIG. 7, in order to make clearly understandable, an example in which two first electrode teeth 51 and a second electrode tooth 71 are formed will be described. In the following description using FIG. 7, for convenience of description, it is to be noted that the upper side, the lower side, the right side and the left side in FIG. 7 will be referred to as the "upper side", "lower side", "right side" and the "left side", respectively. Further, the "up-and-down direction" in FIG. 7 will be referred to as the "thickness direction".

Figure 7A:
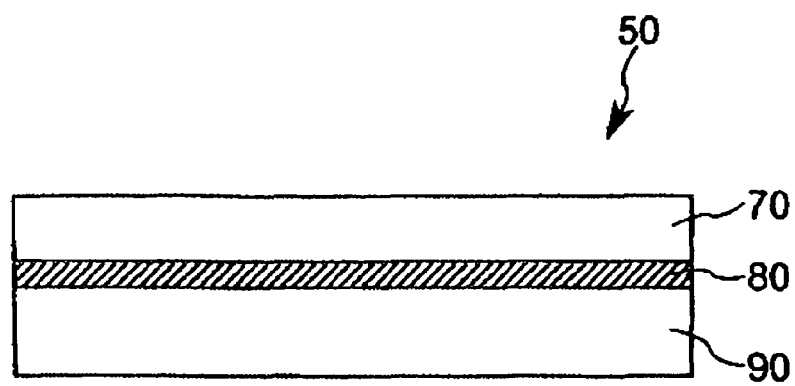
FIG. 7 is an example of a process drawing of a method of manufacturing the actuator.

<1> First, as shown in FIG. 7A, a SOI (Silicon on Insulator) substrate (laminated structure) 50 is prepared. The SOI substrate 50 includes an active layer (first base material) 70 formed of silicon, an insulative layer (intermediate layer) 80 formed of silicon oxide and laminated on the active layer 70, and a base layer (second base material) 90 formed of silicon and laminated on the insulative layer 80. Two silicon substrates in which a silicon oxide film is formed on one major surface thereof may be bonded and used for the SOI substrate 50, or a marketed production (general-purpose item) may be used as the SOI substrate 50. By using such a marketed production particularly, it is possible to prepare a good laminated structure having high evenness of the surface, even thickness and a desired thickness easily and at a low price. Further, it is possible to use one prepared for a base material of other apparatus as a base material for the actuator 100.

Figure 7B:
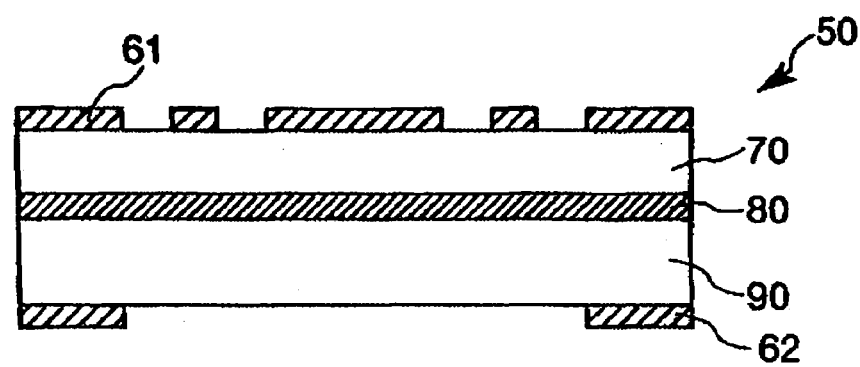

<2> Next, as shown in FIG. 7B, mask layers 61, 62 are formed on the upper and lower surfaces of the SOI substrate 50 using, for example, aluminum or the like, respectively (masking step), and then the SOI substrate 50 with the mask layers 61, 62 are subjected to pattering by means of photolithography, for example to form openings. The shape of the opening on the upper surface of the SOI substrate 50 when viewed from above the upper side in FIG. 7B corresponds to the shape of the structure 10 to be formed. Further, the shape of the opening on the lower surface of the SOI substrate 50 when viewed from above the lower side in FIG. 7B corresponds to the shape of the opening 60 to be formed.

Figure 7C:
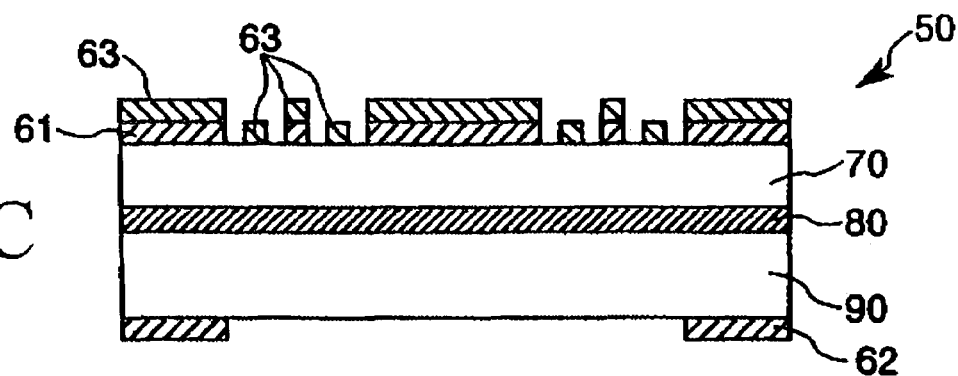

<3> Next, as shown in FIG. 7C, photoresist is selectively applied onto the upper surface of the SOI substrate 50, and then exposure and development are carried out for the SIO substrate 50 with the photoresist. Thus, a pattern of a photoresist 63 used as a mask for a dry etching process is formed.

Figure 7D:
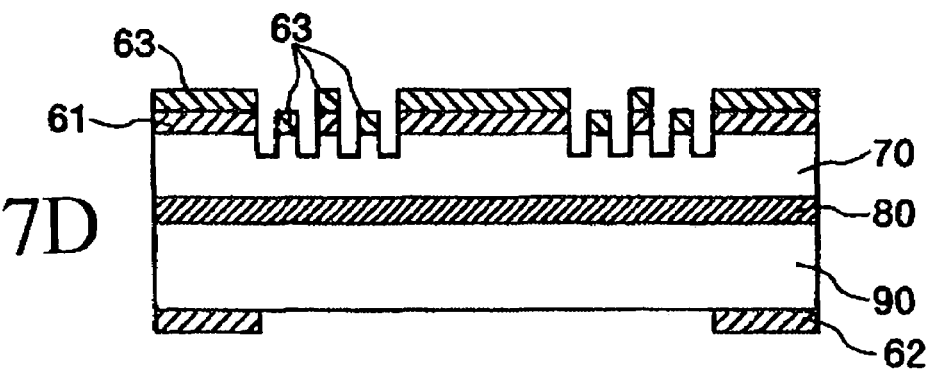

<4> Next, as shown in FIG. 7D, the active layer 70 is subjected to a dry etching process from the upper surface of the SOI substrate 50 partway using the photoresist 63 as a mask. Then, the photoresist 63 on the upper surface of the active layer 70 is eliminated.

As for the etching method, for example, various physical etching methods such as a plasma etching method, a reactive ion etching method, a beam etching method, and a photoassist etching method may be mentioned. In this case, one kind of etching method or two or more kinds of etching methods among them may be utilized.

In this regard, the similar etching method or methods can be utilized in each of the etching processes <5> and <6> will be described later.

Figure 7E:
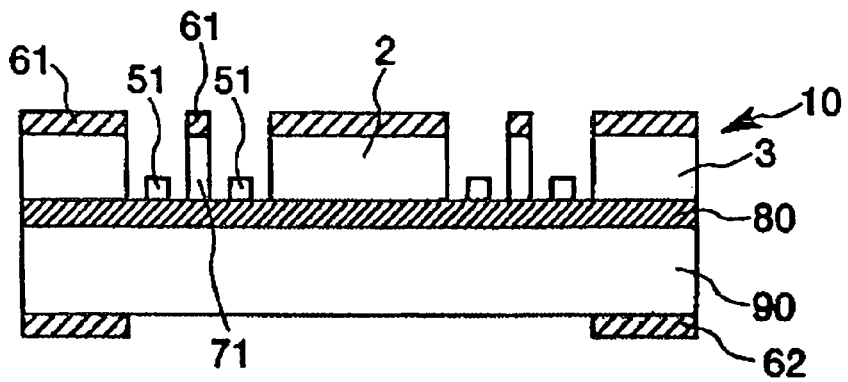

<5> Next, as shown in FIG. 7E, the active layer 70 is subjected to an etching process until reaching the insulative layer 80 from the upper surface of the SOI substrate 50 using the mask layer 61. Thus, the structure 10 including the first electrode teeth 51 and the second electrode tooth 71 which have a step in the thickness direction and are separated from each other so as to be non-contact with each other is formed.

Figure 7F:
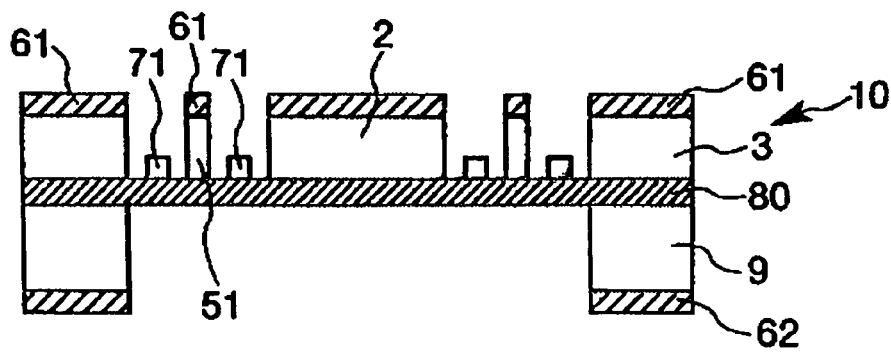

<6> Next, as shown in FIG. 7F, the base layer 90 is subjected to an etching process until reaching the insulative layer 80 from the lower surface of the SOI substrate 50 using the mask layer 62.

Figure 7G:
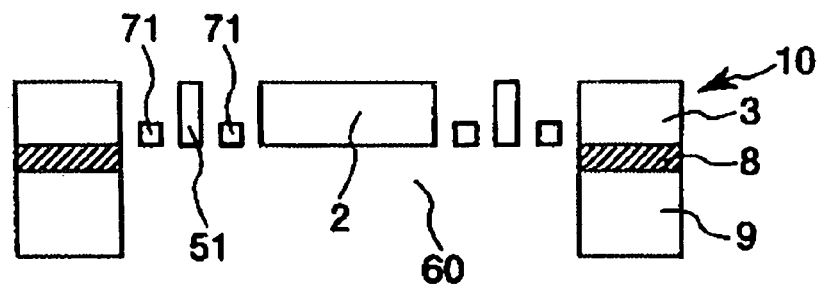

<7> Next, as shown in FIG. 7G, the mask layers 61, 62 are eliminated, and the insulative layer 80 is then subjected to an etching process using fluorinated acid. Thus, the opening 60 is formed.

Figure 7H:
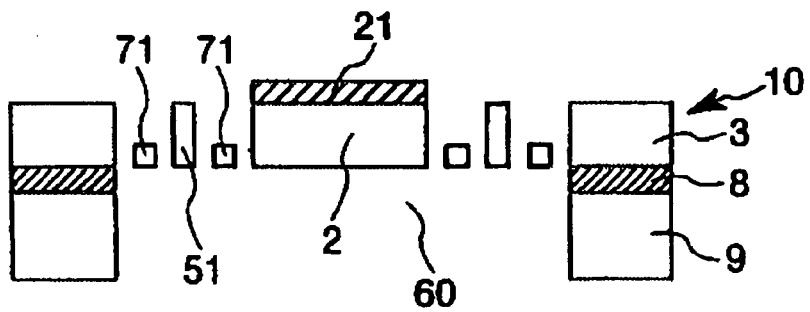

<8> Finally, as shown in FIG. 7H, a mask is formed on the surface of the structure 10 other than the surface of the movable portion 2, and aluminum, aurum or the like is deposited on the surface of the movable portion 2 to form a light reflecting portion (metal reflection film) 21.

As for the method of forming the light reflecting portion 21, various dry plating methods such as a vacuum evaporation method, a sputtering method (a low-temperature sputtering method), and an ion plating method, various wet plating methods such as an electrolytic plating method, and an electroless plating method, a spray method, and joint of a metal foil may be mentioned.

In this regard, in the case where the portion of the mask layer 61 corresponding to the movable portion 2 has been left without elimination at the step <7>, this step <8> is not required.

As described above, the actuator 100 of the first embodiment is manufactured.

As explained above, according to the method of manufacturing the actuator 100 of the first embodiment, since the movable comb electrodes 1, 11, the movable portion 2, the supporting portions 3, 3, the first elastic connecting portions 4, 4, the second elastic connecting portions 5, 5, and the fixed comb electrodes 73, 74, 75 and 76 are formed by subjecting the active layer (common base material, that is, first base material) to predetermined processes, it is possible to manufacture them easily. In particular, it is possible to manufacture the movable comb electrodes 1, 11, and the fixed comb electrodes 73, 74, 75 and 76 easily.

Further, since the movable comb electrodes 1, 11, and the fixed comb electrodes 73, 74, 75 and 76 are formed by means of the predetermined processes from the upper side of FIG. 7 (that is, from one direction), it is possible to manufacture the movable comb electrodes 1, 11, and the fixed comb electrodes 73, 74, 75 and 76 each having a desired shape and size precisely. In other words, it is possible to improve the accuracy of alignment of the movable comb electrodes 1, 11, and the fixed comb electrodes 73, 74, 75 and 76.

Moreover, since it is possible to reduce the steps of the manufacturing method compared with the case the processes are carried out from both surfaces of the SOI substrate 50, it is possible to manufacture the movable comb electrodes 1, 11, and the fixed comb electrodes 73, 74, 75 and 76 more easily.

Furthermore, since the movable comb electrodes 1, 11, and the fixed comb electrodes 73, 74, 75 and 76 each having a desired shape and size can be manufactured precisely, it is possible to shorten the interval of the movable comb electrodes 1, 11, and the fixed comb electrodes 73, 74, 75 and 76 in the axis direction. Thus, it is possible to make the actuator 100 smaller. In addition, it is possible to manufacture the actuator capable of being driven at further lower voltage and with large torque.

SECOND EMBODIMENT

Figure 8:
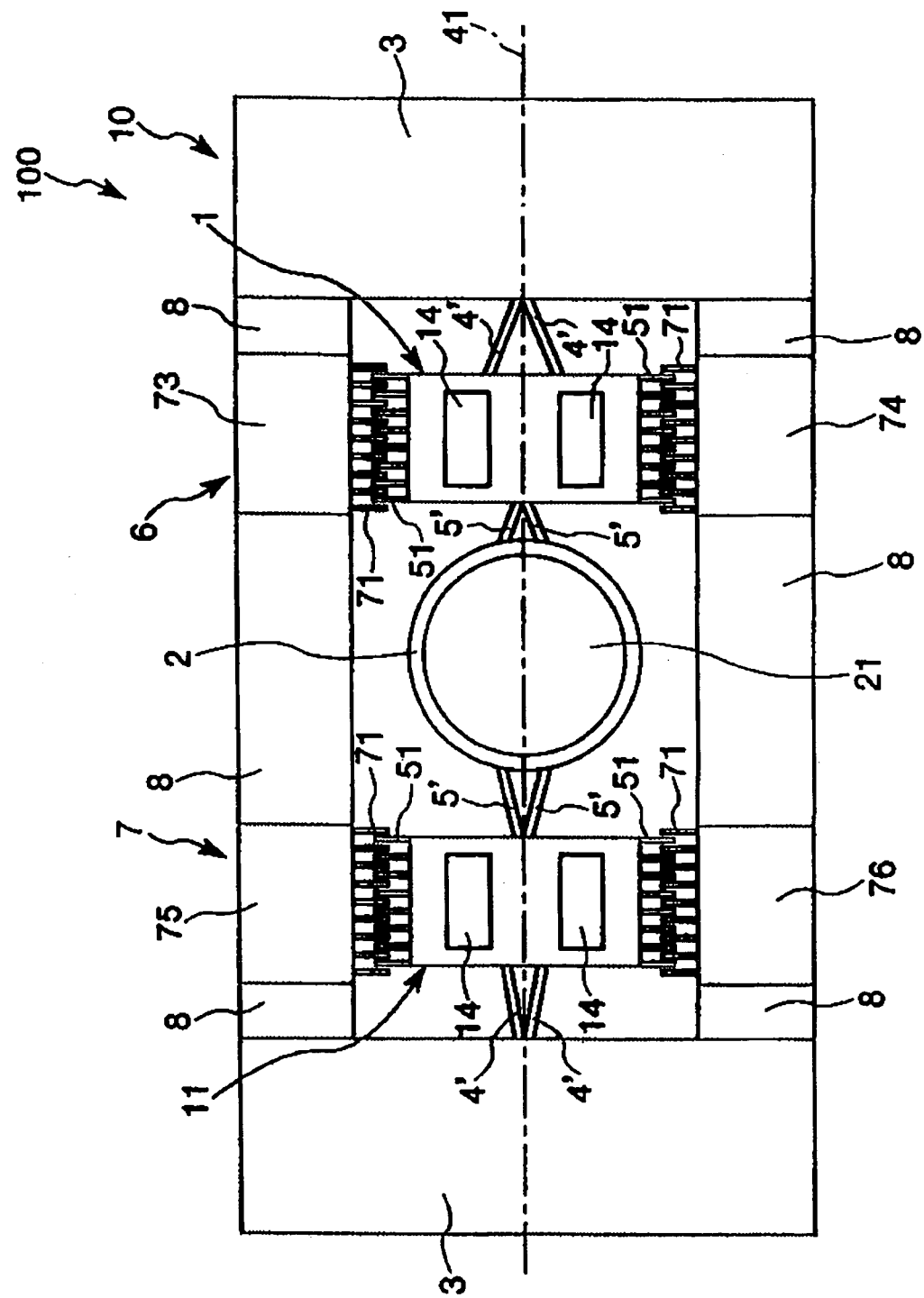
FIG. 8 is a plan view which shows a second embodiment of the actuator according to the invention.

Next, a second embodiment of the actuator according to the invention will be described. FIG. 8 is a plan view which shows the second embodiment of the actuator according to the present invention. Hereinafter, an actuator 100 shown in FIG. 8 will be described by focusing on the difference between the first and second embodiments, and therefore a description of the same points will be omitted.

As shown in FIG. 8, the actuator 100 of the present embodiment includes two pairs of first elastic connecting portions 4', 4', and two pairs of second elastic connecting portions 5', 5'. The two pairs of first elastic connecting portions 4', 4' connect the movable comb electrodes 1, 11 to the supporting portions 3, 3, respectively, so that each of the movable comb electrodes 1, 11 can rotate with respect to the corresponding supporting portion 3. The two pairs of second elastic connecting portions 5', 5' connect the movable portion 2 to the movable comb electrodes 1, 11, respectively, so that the movable portion 2 can rotate in accordance with the rotation (displacement) of the movable comb electrodes 1, 11.

With such a structure, it is possible to suppress the movement of the movable portion 2 in a direction perpendicular to the rotation central axis 41 more reliably. It should be noted that, in such a case, that is, in the case where the actuator 100 includes the two pairs of first elastic connecting portions 4', 4', and the two pairs of second elastic connecting portions 5', 5' as the present embodiment, the spring constants $k_1$ and $k_2$ thereof is determined on the assumption that the two elastic connecting portions 4', 4' connected between one of the supporting portions 3 and one of the driving portions 1, 11 are equivalent to the single elastic connecting portion 4 of the first embodiment which is disposed at substantially the same position as the two elastic connecting portions 4' of this second embodiment.

THIRD EMBODIMENT

Figure 9:
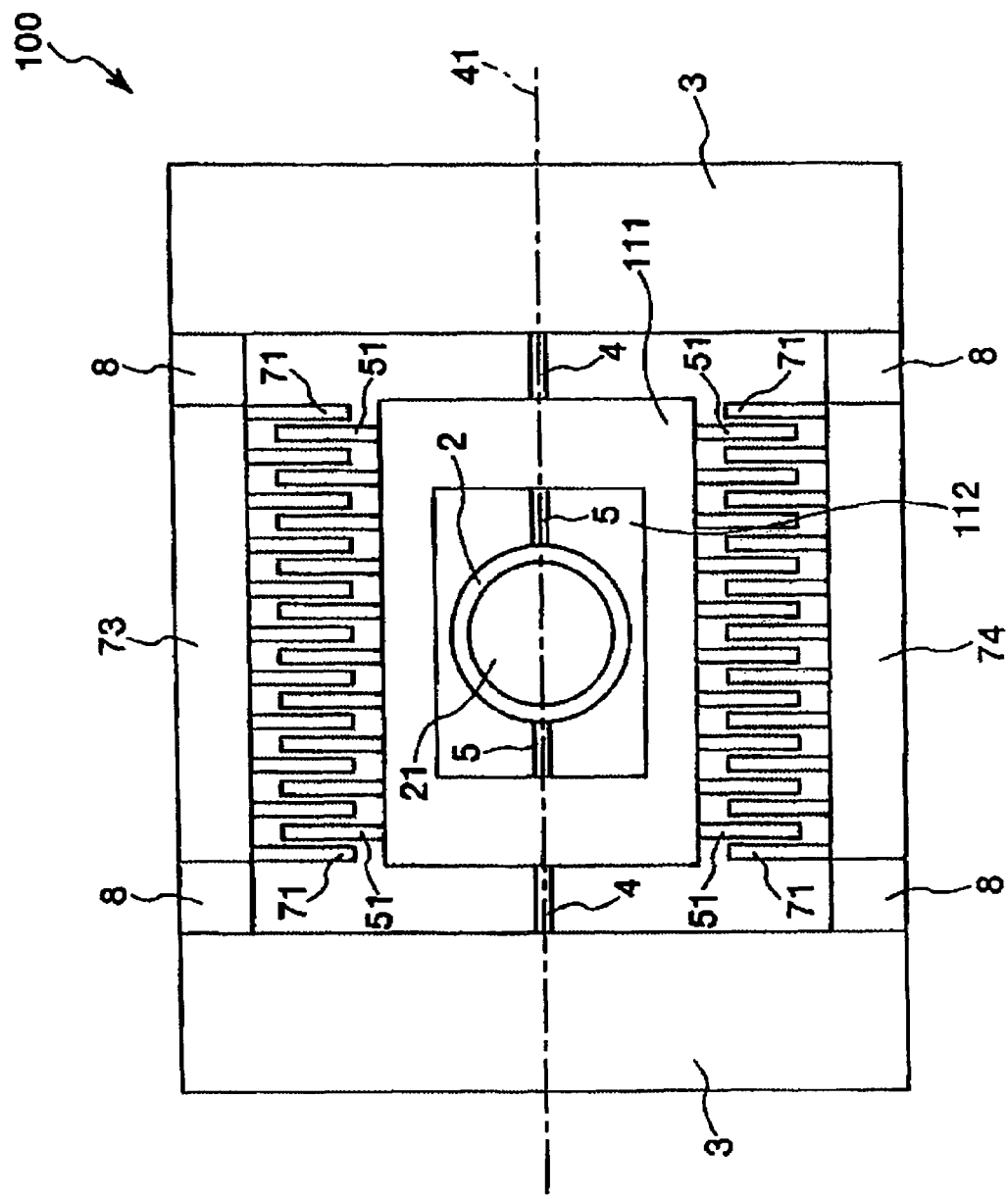
FIG. 9 is a plan view which shows a third embodiment of the actuator according to the invention.
Figure 10:
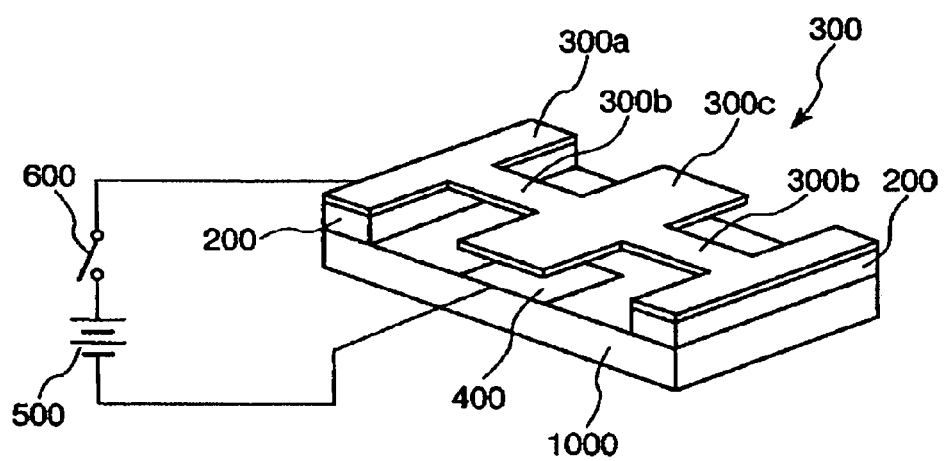
FIG. 10 is a perspective view which shows a conventional actuator.

Next, a third embodiment of the actuator according to the invention will be described. FIG. 9 is a plan view which shows the third embodiment of the actuator according to the present invention. Hereinafter, an actuator 100 shown in FIG. 9 will be described by focusing on the difference between the first and third embodiments, and therefore a description of the same points will be omitted. In the actuator 100 of the present embodiment, one movable comb electrode 111 is formed around a movable portion 2 in a circular manner. In other words, the movable comb electrode 111 is constructed from a electrode base and a plurality of first electrode teeth 51, and an opening 112 is provided in the movable comb electrode 111 at the center portion thereof. The movable portion 2 is provided within the opening 112 of the movable comb electrode 111.

With such a structure, the actuator 100 can have a more stable structure. Further, in the present embodiment, the fixed comb electrode 73 and the corresponding electrode teeth 51 at the upper side in FIG. 9 may be omitted, and alternatively, the fixed comb electrode 74 and the corresponding electrode teeth 51 at the lower side in FIG. 9 may be omitted.

The actuators 100 described above based on the preferred embodiment can be preferably applied to optical scanners to be used in laser printers, bar-code readers, confocal scanning laser microscopes and the like, or displays for imaging, for example.

Although the actuator 100 according to the invention has been descried with reference to the embodiment shown in the drawings, the invention is not limited thereto. For example, so long as the same or similar functions are achieved, it is possible to make various changes and additions to each portion of the actuator 100 of the invention.

Further, even though it has been described that each of the actuators 100 of the embodiments described above has the pair or two pairs of first elastic connecting portions 4 or 4', the actuator 100 according to the invention is not limited thereto and may have three or more pairs of first elastic connecting portions 4 or 4', for example.

Similarly, even though it has been described that each of the actuators 100 of the embodiments described above has the pair or two pairs of second elastic connecting portions 5 or 5', the actuator 100 according to the invention is not limited thereto and may have three or more pairs of second elastic connecting portions 5 or 5', for example.

Moreover, even though it has been described that the light reflecting portion 21 is provided on the surface of the movable portion 2 which does not face the lower substrate 9 in each of the actuators 100 of the embodiments described above, in the actuator 100 according to the invention, the light reflecting portion 21 may be provided on the opposite surface of the movable portion 2, or may be provided on both surfaces of the movable portion 2, for example.

Furthermore, even though it has been described that the first elastic connecting portions 4 or 4' and the second elastic connecting portions 5 or 5' have shapes shown in the drawings in each of the actuators 100 of the embodiments described above, in the actuator 100 according to the invention, the shapes thereof are not limited thereto and they may have a crank shape or a branched shape, for example.

Further, the supporting portions 3, 3 may be formed integrally.

Moreover, even though it has been described that the through-holes 14 are formed in each of the movable comb electrodes 1, 11 in each of the actuators 100 of the first and second embodiments described above, in the actuator 100 according to the invention, the structure is not limited thereto. For example, a concave portion may be formed in each of the movable comb electrodes 1, 11 in order to make the movable comb electrodes 1, 11.

Further, even though it has been described that the actuator 100 is integrally formed in the example of the manufacturing method of the actuator 100 described above, the actuator 100 is not limited to one integrally formed. For example, the structure 10 (that is, the movable comb electrodes 1, 11 or 111, the movable portion 2, the supporting portions 3, 3, the first elastic connecting portions 4, 4 or 4', 4', and the second elastic connecting portions 5, 5 or 5', 5') and the lower substrate 9 may be separately formed and the structure 10 may be bonded to the lower substrate 9 through spacers formed of glass or the like.

Moreover, even though it has been described that the tips 511 of the first electrode teeth 51 completely overlap with the tips 711 of the second electrode teeth 71, they is not limited thereto. The tips 711 of the first electrode teeth 71 may completely overlap with the tips 511 of the second electrode teeth 51.

In this case, it is preferable that the width L4 of each of the first electrode teeth 51 and the width L5 of each of the second electrode teeth 71 satisfy the relation: $0.3 \leq L4/L5$ (A/B) $\leq 1.0$, and more preferably L4 and L5 satisfy the relation: $0.5 \leq L4/L5$ (A/B) $\leq 0.8$.

Furthermore, either the surface of each the movable comb electrodes 1, 11 or the surface of each of the fixed comb electrodes 73, 74, 75 and 76, or both of them may be subjected to an insulative process. This makes it possible to prevent a short circuit from occurring each of the movable comb electrodes 1, 11 and each of the fixed comb electrodes 73, 74, 75 and 76.

What is claimed is:

1. An actuator having a rotation central axis, the actuator comprising:
   a frame having an insulative property;
   a pair of movable comb electrodes spaced apart from each other in a direction parallel to the rotation central axis, each of the pair of movable comb electrodes being provided with an electrode base which has side surfaces at both ends thereof in a direction perpendicular to the rotation central axis, and at least one set of first electrode teeth which are respectively formed on the side surfaces at the both ends of the electrode base and arranged side by side with a predetermined interval on the side surfaces thereof;
   a movable portion provided between the pair of movable comb electrodes;
   a pair of supporting portions provided on the frame for supporting the pair of movable comb electrodes and the movable portion;
   a pair of fixed comb electrodes provided on the frame in the direction parallel to the rotation central axis at the positions which respectively correspond to the pair of movable comb electrodes, each of the pair of fixed comb electrodes being provided with one set of second electrode teeth which are arranged side by side with a predetermined interval so as to be cooperatively associated with the first electrode teeth of the corresponding movable comb electrode;
   a pair of first elastic connecting portions which are directly connected between the electrode bases and the pair of supporting portions, respectively, so that each of the movable comb electrodes can rotate around the rotation central axis of the actuator with respect to the corresponding supporting portion; and
   a pair of second elastic connecting portions which are directly connected between the electrode bases and the movable portion, respectively, so that the movable portion can rotate around the rotation central axis of the actuator in accordance with the rotation of the movable comb electrodes,
   wherein each of the pair of movable comb electrodes is driven by means of Coulomb force generated by applying an alternating voltage between each of the fixed comb electrodes and the corresponding movable comb electrode, whereby the movable portion rotates, and
   wherein the first electrode teeth of each of the pair of movable comb electrodes and the second electrode teeth of each of the corresponding pair of fixed comb electrodes are configured so that at least a part of the first electrode teeth of each of the movable comb electrodes overlaps with a part of the second electrode teeth of the corresponding fixed comb electrode in a state where no alternating voltage is applied therebetween.

2. The actuator as claimed in claim 1, wherein at least a part of the first electrode teeth of each of the movable comb electrodes overlaps with a part of the second electrode teeth of the corresponding fixed comb electrode in a state where no alternating voltage is applied therebetween when viewed from the rotation central axis of the actuator.

3. The actuator as claimed in claim 2, wherein one of the tip of each of the first electrode teeth and the tip of each of the second electrode teeth completely overlaps with the other.

4. The actuator as claimed in claim 1, wherein each of the first electrode teeth has a first width in a direction perpendicular to the frame and each of the second electrode teeth has a second width in a direction perpendicular to the frame, in which the first width of each of the first electrode teeth is larger than the second width of each of the second electrode teeth when viewed from the rotation central axis of the actuator.

5. The actuator as claimed in claim 4, wherein, in the case where the first width of each of the first electrode teeth is defined as A (μm) and the second width of each of the second electrode teeth is defined as B (μm), then A and B satisfy the relation: $1.0 \leq A/B \leq 3.0$.

6. The actuator as claimed in claim 4, wherein each of the first electrode teeth has upper and lower edges in the width direction thereof and each of the second electrode teeth has upper and lower edges in the width direction thereof, in which either the upper edge or the lower edge of each of the first electrode teeth is substantially aligned with the corresponding edge of each of the second electrode teeth in a state where no alternating voltage is applied therebetween when viewed from the rotation central axis of the actuator.

7. The actuator as claimed in claim 1, wherein the at least one pair of fixed comb electrodes and the pair of movable comb electrodes are formed by subjecting a first base material to predetermined processes.

8. The actuator as claimed in claim 7, wherein the pair of supporting portions, the movable portion, the at least one pair of first elastic connecting portions and the at least one pair of second elastic connecting portions are formed by subjecting a base material common to the first base material to predetermined processes.

9. The actuator as claimed in claim 7, wherein the at least one pair of fixed comb electrodes and the pair of movable comb electrodes are separately formed by subjecting the first base material to patterning so that each of the at least one set of first electrode teeth does not come into contact with the corresponding second tooth.

10. The actuator as claimed in claim 7, wherein the first base material is formed of silicon.

11. The actuator as claimed in claim 1, wherein the frame is constructed from a laminated structure which comprises an intermediate layer formed of silicon oxide and a second base material formed of silicon and laminated on the intermediate layer.

12. The actuator as claimed in claim 1, wherein the frame is provided with an opening at a portion corresponding to the movable portion and/or the pair of movable comb electrodes.

13. The actuator as claimed in claim 1, wherein one or more through-holes is formed in the electrode base of each of the pair of movable comb electrodes.

14. The actuator as claimed in claim 1, further comprising a light reflecting portion provided on the movable portion.

15. The actuator as claimed in claim 1, wherein, in the case where the spring constant of the first elastic connecting portion is defied as $k_1$ and the spring constant of the second elastic connecting portion is defined as $k_2$, $k_1$ and $k_2$ satisfy the relation: $k_1 > k_2$.

16. The actuator as claimed in claim 1, wherein the actuator is of the type which employs a two-degree-of-freedom vibration system, and the frequency of the alternating voltage is set so as to be substantially the same as a lower resonance frequency of resonance frequencies of the two-degree-of-freedom vibration system at which the pair of movable comb electrodes and the movable portion resonate.

17. The actuator as claimed in claim 1, wherein at least one of the pair of first elastic connecting portions and the pair of second elastic connecting portions includes a piezoresistive element.

18. The actuator as claimed in claim 1, wherein the frame defines a substantially rectangular frame shape having an opening in which the pair of movable comb electrodes, the movable portion, the pair of first elastic connecting portions and the pair of second elastic connecting portions are provided, and the frame has a lower substrate and an insulation portion formed on the lower substrate, and wherein the pair of fixed comb electrodes are provided on the insulation portion.

19. An actuator having a rotation central axis, the actuator comprising:

a frame having an insulative property;

a movable comb electrode provided with an electrode base having side surfaces at both ends in a direction perpendicular to the rotation central axis, and one set of first electrode teeth which are respectively formed on the side surfaces at the both ends thereof and placed side by side with a predetermined interval, the electrode base having an opening;

a movable portion provided in the opening of the electrode base;

a pair of supporting portions provided on the frame for supporting the movable comb electrode and the movable portion;

two fixed comb electrodes provided on the frame at the positions which correspond to the movable comb electrode in the direction substantially perpendicular to the rotation central axis, each of the two fixed comb electrodes being provided with one set of second electrode teeth which are arranged side by side with a predetermined interval so as to be cooperatively associated with the at least one set of first electrode teeth of the movable comb electrode;

a pair of first elastic connecting portions which are directly connected between the electrode base and the pair of supporting portions, respectively, so that the movable comb electrode can rotate around the rotation central axis of the actuator with respect to the pair of supporting portions; and a pair of second elastic connecting portions which are directly connected between the electrode base and the movable portion, respectively, so that the movable portion can rotate around the rotation central axis of the actuator in accordance with the rotation of the movable comb electrode, wherein the movable comb electrode is driven by means of Coulomb force generated by applying an alternating voltage between each of the fixed comb electrodes and the movable comb electrode, whereby the movable portion rotates, and wherein the first electrode teeth of the movable comb electrode and the second electrode teeth of each of the fixed comb electrodes are configured so that at least a part of the first electrode teeth of the movable comb electrode overlaps with a part of the second electrode teeth of each of the fixed comb electrodes in a state where no alternating voltage is applied therebetween.

20. The actuator as claimed in claim 19, wherein the frame defines a substantially rectangular frame shape having an opening in which the movable comb electrode, the movable portion, the pair of first elastic connecting portions and the pair of second elastic connecting portions are provided, and the frame has a lower substrate and an insulation portion formed on the lower substrate, and wherein two fixed comb electrodes are provided on the insulation portion.

* * * * *